US009740800B2

(12) United States Patent
Suryanarayan (10) Patent No.: US 9,740,800 B2
(45) Date of Patent: Aug. 22, 2017

(54) SYSTEMS AND METHODS FOR INTELLIGENT POWER TOOL ACCESS

(71) Applicant: GM GLOBAL TECHNOLOGY OPERATIONS LLC, Detroit, MI (US)

(72) Inventor: Krishna P. Suryanarayan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1008 days.

(21) Appl. No.: 14/031,387

(22) Filed: Sep. 19, 2013

(65) Prior Publication Data

US 2015/0081253 A1 Mar. 19, 2015

(51) Int. Cl.
*G06F 17/50* (2006.01)
*B25B 23/14* (2006.01)
*B23P 19/06* (2006.01)

(52) U.S. Cl.
CPC .............. *G06F 17/50* (2013.01); *B25B 23/14* (2013.01); *B23P 19/066* (2013.01); *G06F 2217/02* (2013.01)

(58) Field of Classification Search
CPC ..... G06F 17/50; G06F 2217/02; B25B 23/14; B23P 19/066
USPC ............................................................ 703/1
See application file for complete search history.

(56) References Cited

U.S. PATENT DOCUMENTS

2007/0180674 A1* 8/2007 Morden .................. B21J 15/14
29/407.01
2013/0286187 A1* 10/2013 Slesinski ................ B25B 21/00
348/94

OTHER PUBLICATIONS

Bowland et al. "A PDM- and CAD-integrated assembly modelling environment for manufacturing planning". Journal of Materials Processing Technology 138 (2003) 82-88.*
Maimon et al. "On the Complexity of the Design Synthesis Problem". 1996 IEEE., p. 142-151.*

* cited by examiner

*Primary Examiner* — Eunhee Kim
(74) *Attorney, Agent, or Firm* — Lorenz & Kopf, LLP (57) ABSTRACT

Systems and methods are provided for designing a composite tool to manipulate a specific set of known fasteners in a product, the fastener(s) having a constrained access and specific torque requirements. The system comprises a display screen, a database, a means for scanning and a computing device executing at least an operating system configured to operate the display screen, the database and the means for scanning. The computing device is further configured to electronically select a virtual socket that is configured to properly engage the fastener at its driving end, virtually position at the fastener in a pre-secure and a post-secure position within a virtual constrained access, and electronically determine the existence of an interference condition at either or both of the pre-secure or post-secure position. When an interference condition exists, computing device electronically selects another socket with a different dimension and repeating the virtual positioning and electronically determine steps.

18 Claims, 4 Drawing Sheets

SYSTEMS AND METHODS FOR INTELLIGENT POWER TOOL ACCESS

TECHNICAL FIELD

The technical field generally relates to power tools and manual wrenches along with a combination of sockets and extensions used for fastener assembly or disassembly. Specifically, the technical field relates to a method for creating a custom power tool to access a given set of fasteners at locations with only limited, or otherwise constrained access.

BACKGROUND

Manufacturing is becoming more sophisticated every day reflecting the drive to reduce size, weight and therefore, cost of products while maintaining quality. To do so, products may be manufactured with tight tolerances and that in certain instances requires special fasteners and tools.

For example in the automotive industry, the typical architecture has over 2500 hex fasteners (i.e. screws, bolts or nuts) that are utilized. Coupling the vast number of fasteners with a myriad of unique constrained fastener access scenarios make it a cumbersome task to assemble a tool that can complete assembly.

Thus, it is desirable to address these issues and produce an improved product without production delays by developing systems and methods to construct specialized tools to reach a particular fastener in a location with complex or otherwise constrained access. The term "constrained access" as used hereinafter is expressly defined as "access to a fastener that is obscured or otherwise indeterminable by a human based on readily available information including direct observation and/or direct measurement."

Furthermore, other desirable features and characteristics of the present invention will become apparent from the subsequent detailed description and the appended claims, taken in conjunction with the accompanying drawings and the foregoing technical field and background.

SUMMARY

A computer implemented method is presented for designing a composite tool to manipulate a specific known fastener in a product, where the fastener has a constrained access and specific torque requirements. The method comprises electronically selecting a virtual socket with a first end and a second end that is configured to properly engage the fastener at its driving end, virtually positioning at the fastener in a pre-secure and a post-secure position within a virtual constrained access and electronically determining the existence of an interference condition at either or both of the pre-secure or post-secure position. When an interference condition exists, electronically selecting another socket with a different dimension and repeating the virtually and electronically determining steps.

A system is presented for designing a composite tool to manipulate a specific known fastener in a product, the fastener having a constrained access and specific torque requirements. The system comprises a display screen, a database, a means for scanning and a computing device executing at least an operating system configured to operate the display screen, the database and the means for scanning. The computing device is further configured to electronically select a virtual socket with a first end and a second end that is configured to properly engage the fastener at its driving end, virtually position at the fastener in a pre-secure and a post-secure position within a virtual constrained access, and electronically determine the existence of an interference condition at either or both of the pre-secure or post-secure position. When an interference condition exists, computing device electronically selects another socket with a different dimension and repeats the virtually positioning and electronically determining steps.

DESCRIPTION OF THE DRAWINGS

The exemplary embodiments will hereinafter be described in conjunction with the following drawing figures, wherein like numerals denote like elements, and wherein.

DETAILED DESCRIPTION

The various illustrative components described in connection with the embodiments disclosed herein are merely exemplary and which may be modified with a multitude of adjustments to the various components disclosed herein without departing from the scope of this disclosure. The word "exemplary" is used exclusively herein to mean "serving as an example, instance, or illustration." Any embodiment described herein as "exemplary" is not necessarily to be construed as preferred or advantageous over other embodiments.

The method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. Any process steps may be interchanged in any order without departing from the scope of the invention as long as such an interchange does not contradict the claim language and is not logically nonsensical.

Further, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Those of skill in the art will appreciate that the various illustrative logical blocks, modules, circuits, and algorithm steps described in connection with the embodiments disclosed herein may be implemented as electronic hardware, computer software executing on hardware, or combinations of both. Some of the embodiments and implementations are described herein in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software executing on hardware, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations. Further, any method steps described herein may be rearranged in order, consolidated together or may be separated into sub-steps without departing from the spirit of the scope of this disclosure.

Figure 1:
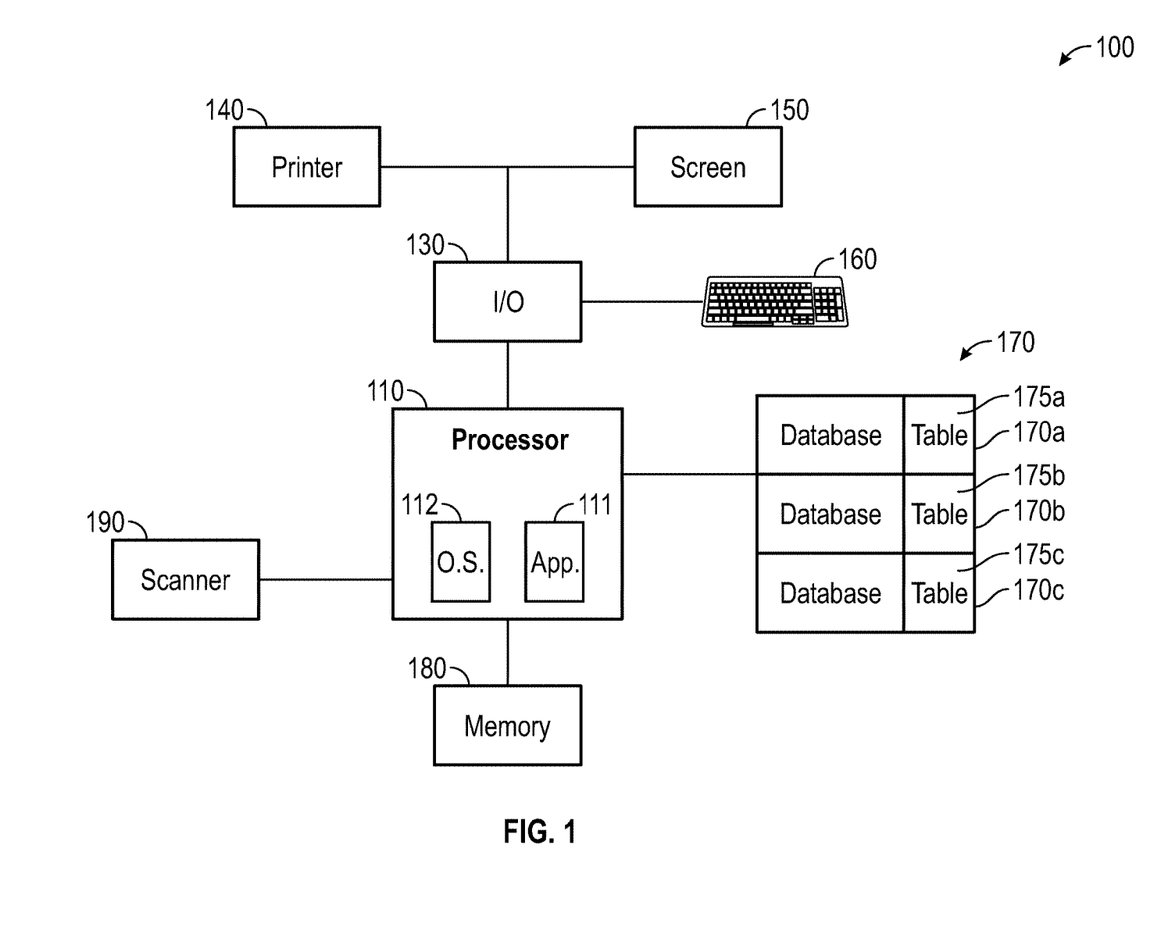
FIG. 1 is a functional block diagram of an exemplary system for designing a composite tool to manipulate a specific known fastener with constrained access and torque specifications according to various embodiments.

FIG. 1 is a simplified functional block diagram of a system for designing a composite tool to manipulate a specific known fastener with constrained access and torque specifications. The system shown is merely exemplary. Those of ordinary skill in the art may recognize alternative architectures and alternative components may be utilized to attain the same function without departing from the scope of the disclosure herein.

Processor 110 is any suitable processor known in the art capable of executing instructions and processing data required by the components chosen to implement the subject matter disclosed herein. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processor 110 communicates with a local memory device 180 such as a ROM, RAM, Flash or other such memory devices. The memory device 180 may be a volatile or non-volatile memory device. Processor 110 executes one or more computer applications 111.

Processor 110 communicates with a database 170. The database 170 may be a single database or a collection of databases (170a ... 170n). The database(s) 170 may include different types of data such as a Library of Objects 170a, a Library of Rules 170b and Product Specifications Library 170c. One or more of the libraries (170) contains, or is in the form of, a look up table (175a-c).

The Library of Objects 170a includes a list of all of the power tools, fasteners, sockets compatible with each fastener for each power tool, extensions for the sockets and the physical specifications for each. The Library of Objects 170a may also include a list of available hand tools capable of driving a fastener and a list of complex tools that may be used to drive a fastener such as multi spindles, geared offset tools, Lubbering heads, inline drivers, etc.

The Library of Rules 170b comprises the torque specifications for each fastener for a specific joining between two particular parts in a product. Torque specifications are provided based on the type of parts being held together, the type of function they perform, safety and other performance requirements that the joining needs to meet. A set of rules based on best practices has been established by the experts in the fastening arena, taking into account these varied requirements. If less torque than what is required is used, then the joint can fail during use. If too much torque is used it can damage the parts being held together. The Library of Rules 170(b) may also include conditional specifications that direct a certain action if a condition precedent exists.

The database(s) 170 may also include a data base of Product Specifications Library 170c that may be used to help the processor 110 determine the precise access dimensions to a particular fastener in a particular location. Specifications include clearance criteria that a combination (tool, socket, extension) needs to meet to ensure that (a) the fastener can be accessed (b) there is no mutilation to any of the exposed surfaces, and that (c) dimensional variation of the parts is accounted for.

The processor 110 also communicates with an input/output (I/O) device 130. The I/O device may be any suitable I/O device that currently exists or that may exist in the future. The I/O device 130 coordinates input and output commands between the processor 110 and various peripherals such as printer 140, display screen/touch screen 150 and a user interface device 160 such as a keyboard, mouse, joy stick or other functionally equivalent device.

The processor 110, and any companion processors, also communicates with a scanning means 190, whose operating system 112 executes on processor 110 or on another companion processor as may be known in the art. Scanning means 190 may be any sonic, ultrasonic, optic, laser, electromagnetic, magnetic or tactile measuring device, or combination thereof, as may be known in the art or that may be developed in the future incorporated into a single device or embodied as multiple devices. The scanning means 190 measure and survey spaces containing fasteners or that will contain fasteners that are limited access spaces.

A robotic device(s) equipped with a selection of laser measuring peripherals is a non-limiting example of the scanning means 190 for measuring the type and location of a fastener(s) 210 (See, FIG. 2) and measuring the three dimensional limited access to the fastener 210 dictated by the surrounding product components 215. Suitable scanning means 190 are manifold. The technology controlling scanning means 190, and processing the data produced thereby, is well known in the art. As such, further discussion of the scanning means 190 is unnecessarily voluminous and is beyond the scope of this disclosure and will not be discussed further herein. A non-limiting example of the scanning means 190, which can include a laser probe, such as a 3D laser probe, is the Wizprobe™ scanner probed marketed by Coord3 Metrology, Inc. Sonic, ultrasonic, magnetic and electromagnetic measuring probes other scanning means 190 and examples are likewise easily locatable in the market.

Figure 2:
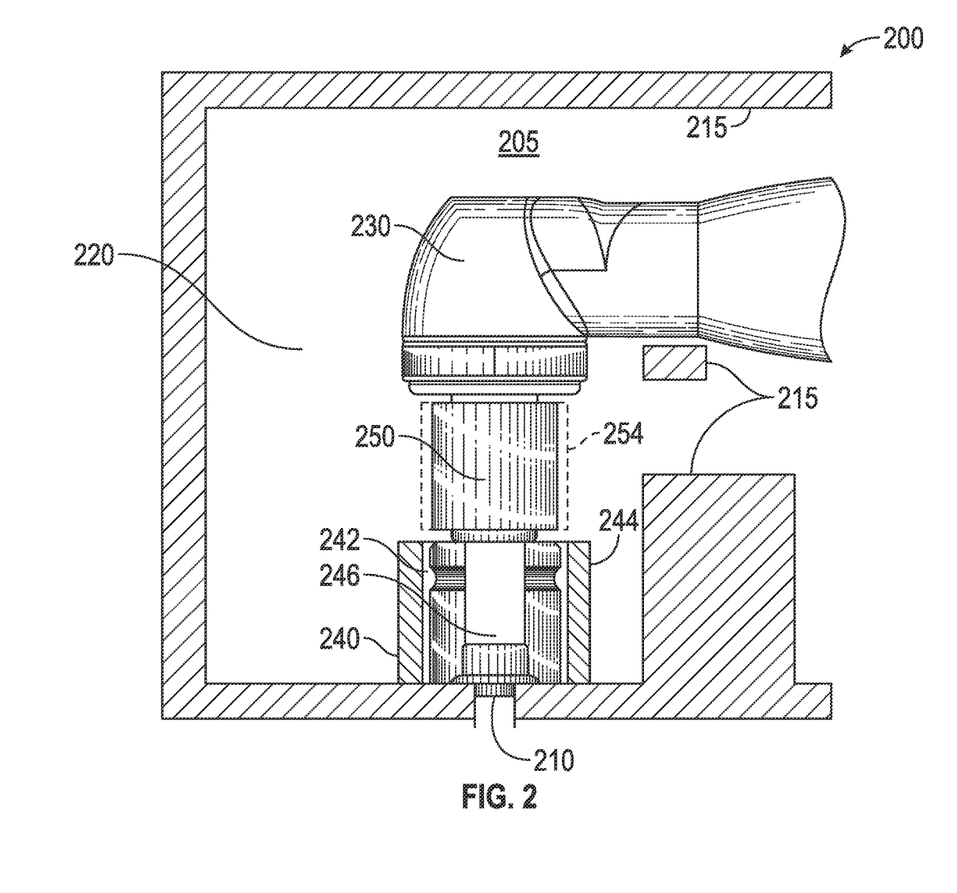
FIG. 2 is a simplified depiction of a composite tool applied to an exemplary fastener with a restricted access according to various embodiments.

FIG. 2 is a simplified depiction of a fastener 210 in an exemplary location within a product 200 with constrained access 205. The fastener 210 is being accessed by a tool 220 designed according to the subject matter described herein. In one of various embodiments, the fastener 210 is a conventional nut, screw or bolt. However, the subject matter herein disclosed is not intended to be so limiting. The tool 220 comprises a power tool 230, a socket 240 and a socket extension 250, if any is required to access and drive the fastener 210.

The socket 240, comprises the socket body 246, which is the socket proper, and a sleeve body 242. The sleeve body 242 is a plastic sleeve that is placed over the socket 240 to protect the parts from mutilation.

The clearance body 244 shown in FIG. 2 is merely a notional pre-defined space around the sleeve body 242 but has been included into the model of the sockets 240 as a 'real' part that is visible and is used to build in additional clearance margin. Although an interference of the product components 215 with the clearance body 244 is a "soft interference," it does not preclude actual access. Access would merely be tighter than desired. Contrarily, interference between the sleeve body 242 and any components 215 of the product is a "hard interference" and precludes access. Similarly, the socket extension 250 has similar sleeve bodies and clearance bodies (not shown) associated with them.

Thus, the term "interference" as used herein has at least two sub-definitions although those of ordinary skill in the art may include more or fewer sub-definitions. A "hard interference" is a sub-definition of "interference" that means that the power tool 230 or the sleeve body 242 of either the socket 240 or the extension 250 contacts any part of the product component 215 when the fastener 240 is in either a pre-secure or post-secure positions, or any position in between.

Figure 3:
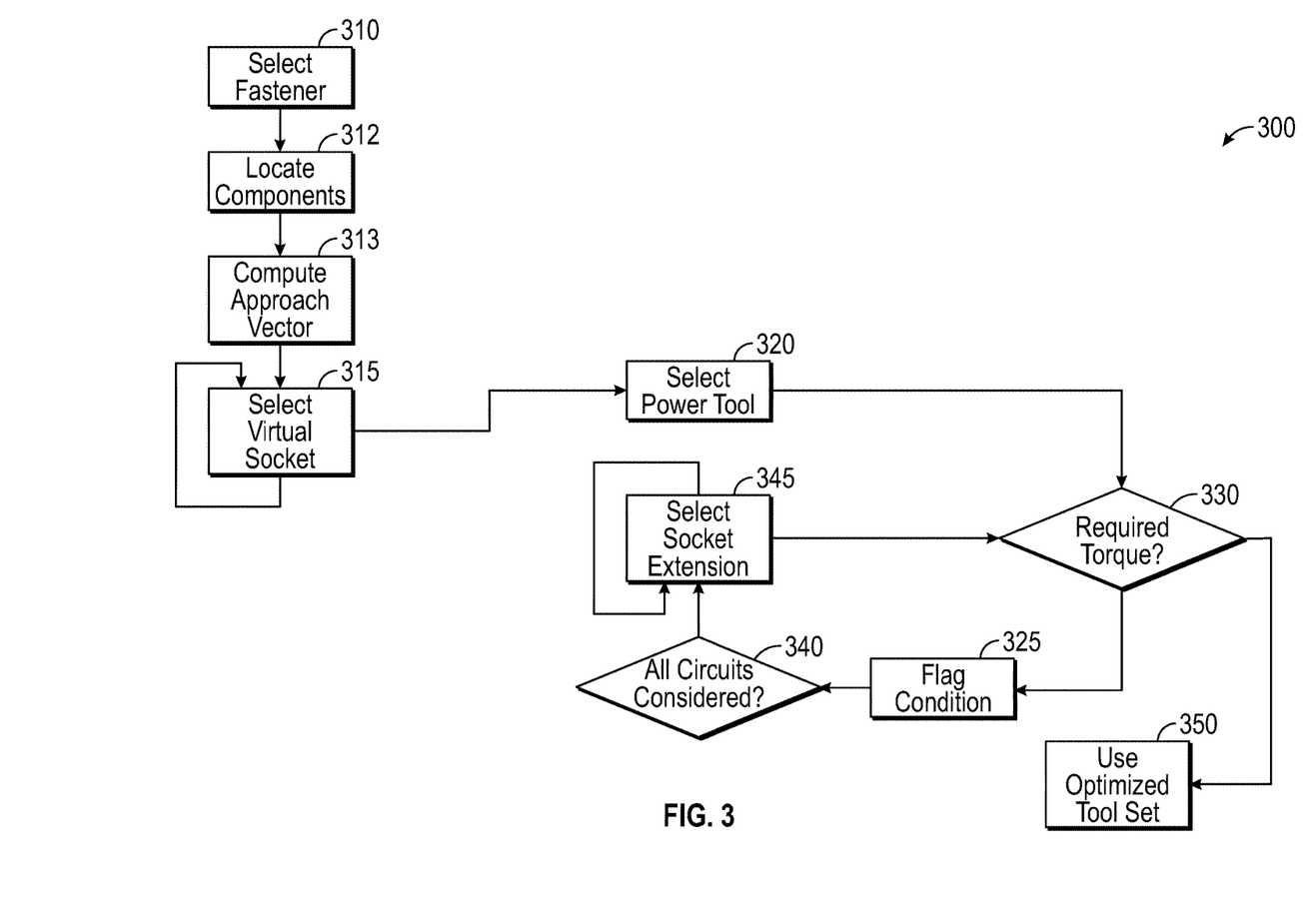
FIG. 3 is a logic flow diagram of an exemplary computer based method for designing a composite tool to manipulate a specific known fastener with constrained access and torque specifications according to various embodiments.

FIG. 3 is a logical flow diagram of an exemplary computer aided (e.g., CAD/CAM) design method 300 for designing a composite tool to manipulate a specific, known fastener 210 with constrained access 205 (see, FIG. 2) and defined torque specifications. At process 310, a fastener(s) 210 of interest is selected by a user on a graphical use interface on display 150. The length and type of fastener of concern is known information determined from a parts list, specification, physical markings/observation, etc, within the Library of Objects 170*a*. If multiple fasteners 210 are selected as being of interest, it is verified that all those selected have the same type and size of driving end.

At process 312, components 215 that are located adjacent to, or in the immediate vicinity of the fastener 210 of interest are identified and their dimensions are retrieved from the product specifications library 170*c* or CAD model and loaded into the processor 110 or memory device 180. At process 313, the processor 110 computes a most likely "approach vector" that allows the most direct access to the fastener 210.

"Best practices," "lessons learned" or other information concerning the product components 215 and the power tool 220 may indicate that a particular "approach vector" be stipulated. An "approach vector" is a direction from which the power tool approaches the fastener 210. The approach vector may be stipulated as a range of vectors or an "allowable angle/sector" in three dimensions. If an allowable angle is stipulated, then the processor 110 initially positions the power tool 220 at an approach vector that bisects the allowable angle/sector.

At process 315, a virtual socket 240 is selected from the Library of Objects 170*a* that properly fits the driving portion of the selected fastener 210 (i.e., a nut, bold or screw) by the processor 110. For the sake of simplicity and clarity, it will be assumed herein that a particular socket exists in a "standard," "short," and "long" variation although the scope of the description herein is not intended to be so limiting. The virtual socket 240 selected may be a random socket that is known to be configured to fit the driving portion of the fastener 210 or may be a socket of a certain type based on an algorithm that sorts the Library of Objects 170*a*. For the sake of simplicity of explanation, the initial socket selected will be assumed to be the "standard" length socket that properly fits the driving portion of the virtual fastener 210. Once selected, the virtual socket is virtually positioned on the driving end of the virtual fastener(s) 210. The processor 110 determines if there is a "hard interference."

The term "pre-secure" or "pre-secure position" expressly describes the situation in which the socket 240 and the extension 250, if any, with the fastener 210 in the socket 240 (e.g., a magnetic socket) is hovering over the centerline of the location receiving the fastener 210 and is just about to be inserted and driven. This is in contrast to the term "post-secure" or "post-secure position," which expressly describes the situation in which the socket 240 and the extension 250, if any, has just placed the fastener in the final, secured or driven position.

In some equivalent embodiments, the fastener 210 may be "hand started," which refers to the common practice of manually driving a fastener into a hole by hand for a first incremental distance. A common example is manually twisting a threaded bolt for a longitudinal distance of a couple of threads. Herein, the pre-secure position may alternatively be a hand start position. As such, the pre-secure position is adjusted by the number to threads inserted by hand (e.g., two threads) from the "hovering" scenario discussed above.

A "soft interference" is a second sub-definition that means that the notional clearance body 244 or 254 of either the socket 240 or the extension 250, respectively, contacts any of the product components 215 when at the pre-secure or post-secure positions.

As long as a hard interference exists, the method at 315 cycles through the virtual sockets 240 of different lengths that are known to fit the driving end of the fastener 210 to determine if the hard interference clears. If the hard interference cannot be cleared by applying the other compatible sockets, the method indicates (i.e., flags) the particular fastener 240 has a hard interference and proceeds to repeat the process 315 for any of the other fasteners 240 of interest. If the hard interference clears by finding an alternative socket, the method proceeds to process 320. If not, the fastener 210 is flagged with as a hard interference.

At process 320, a power tool is selected by the processor 110 to attach to the socket determined in process 315. The power tool selection criteria include a pre-defined "recommended" tool as well as alternative tools that can properly couple with the socket and deliver the torque specifications for the product 200 from the Library of Rules 170b.

The torque specifications comprise a range. The low minimum torque depends at least in part on torque required for the proper joining of the parts concerned, the material comprising those parts. The maximum torque depends at least in part on the torsion tolerance of the material comprising the fastener so that the driving end of the fastener is not twisted off.

Another power tool selection criteria includes the form factor dimensions of the tool. A long, skinny power tool 230 may be more conducive to accomplishing the task of reaching the fastener 210 than a power tool 230 that is bulky and compact. Further, "best practices" and "lessons learned" may also be a factor in selecting a power tool 230.

Some additional exemplary include criteria drive type (electric or pneumatic), Rotations per Minute (RPM), size of head, length of handle, drive size (¼", ⅜" etc.). The drive size is a stub on the power tool that engages with a female receptacle on the socket. Any physical dimension (e.g., drive size, size of head, length of handle) can be measured by the application in real time or looked up from a table. The other criteria and determined from a look up table.

At process 320, it is further determined whether there is a hard interference or a soft interference with the power tool 230 that occurs at the approach vector(s). If so, the approach vector and tool orientation is varied incrementally within the allowable angle/sector to arrive at an interference free approach vector, with the fastener 210 as a pivot point. This process is not merely a trial and error procedure. The initial approach vector is calculated to be interference free. However, a virtual insertion to the fastener may reveal the approach vector to be an ergonomically awkward approach vector.

An "interference free" approach is the condition where the power tool 230 does not contact a product component 215 when engaging the fastener 210 with an attached socket 240 at both the per-secure and post secure positions.

At decision point 330, it is determined whether the power tool 230 and socket 210 combination existing at process 320 accesses the fastener 210 without an interference and is capable of delivering the required torque. Further, when a hard interference is determined to exist at all possible approach angles, the fastener/fastener location is flagged with a "red" condition and the method moves to decision point 340. Otherwise the fastener 210 is flagged as being clear or, in other words, has a "yellow" or "green" condition. If cleared, the method moves to process 350.

If a hard interference is not cleared at decision point 330, a determination is made at determination point 325 as to whether or not all of the sockets 210 in the Library of Objects 170a have been considered by the method 300. If not, the method 300 returns to process 315 where an alternative type socket 240 or alternative sized socket 240 of the same type is selected by the processor 100. Another power tool is also selected.

Alternatively, if all sockets 240 have been considered and the non-interference requirements of the socket and power tool combination have not been met at decision point 330, then the method proceeds to process 345 where the processor 110 selects a socket extension 250 for inclusion into the tool 220 in an attempt to clear any red interference conditions. In this process, the original standard socket 240 that was determined to be interference free is chosen from the Library of Objects 170a along with a socket extension 250 that is indicated in the Library of Objects 170a to be compatible with the socket 240.

If the addition of the extension 250 to the tool 220 does not clear the hard interference of the socket and power too combination, then the process proceeds to investigate all combinations of sockets 240 that have been found to be interference free and extensions 250 that are compatible with the power tool 230 until a combination of socket, extension and power tool is found that clears the hard interference condition in both the pre and post-secure positions at process 330. Regardless as to whether a combination of socket and extension is found that clears the hard interference condition at both the pre and post-secure positions, when all of the combinations of sockets 240, extensions 250 and power tools 230 have been examined the method 300 proceeds to process 340. Fasteners 210 that have hard interferences (i.e. red condition) that cannot be cleared are assigned a "standard" sized socket 240 with the best fit extension 250 and power tool 220 to at least minimize contact with the surrounding product components 215.

At process 340, an optimized solution for all of the fasteners 210 of interest is determined. For fasteners 210 that have a tool 220 solution that results in no interferences or has a soft interference (i.e., a yellow condition) with a product component 215, then the number of tool combinations (socket, extension, power tool) is minimized. This is done by iteratively determining if the tool 220 for one of the fasteners 210 of interest will work interference free for any of the other fasteners. If a single combination tool 220 will not work for all fasteners, then it is determined if two combination tools 220 will work for all of the fasteners of interest. The process is continued until the minimum number of tool combinations is found that may be applied to all of the fasteners of interest and then the method 300 proceeds to process 350.

At process 350, the optimized tool set is used to document the pre and post secure positions for each tool for each fastener of interest as well as a workable approach vector or the workable approach angle(s). Each fastener of interest is indicated as having a red condition (hard interference-no resolution), yellow condition (soft interference-marginal access), or green (no interference). A "yellow" condition is when the clearance requirement for the tool/socket/extension is not met but there is no hard interference. A "green" condition is when the clearance requirements are fully met. A "red" condition is when there is hard contact/interference between any part on the tool combination and the surrounding product parts.

For example, if part "A" requires four fasteners 210 of the same type (e.g., 10 mm hex bolts), and the method 300 initially produces four tool combinations (socket, extension, power tool), then the method applies each tool to each fastener 210 at different approach angles until one or more of the combinations is indicated as being redundant and can be eliminated.

At process 360, a report (graphical or hard copy) is compiled and presented to a user describing the designed tools 220. The report includes, but is not limited to power tool model, socket specification, extension specification and what product components 215 are causing the interference conditions. Electronic drawings may be also be presented to the user on the display 150 showing the locations of each fastener, recommended approach angles, and clearances in both the pre and post secure positions.

Figure 4:
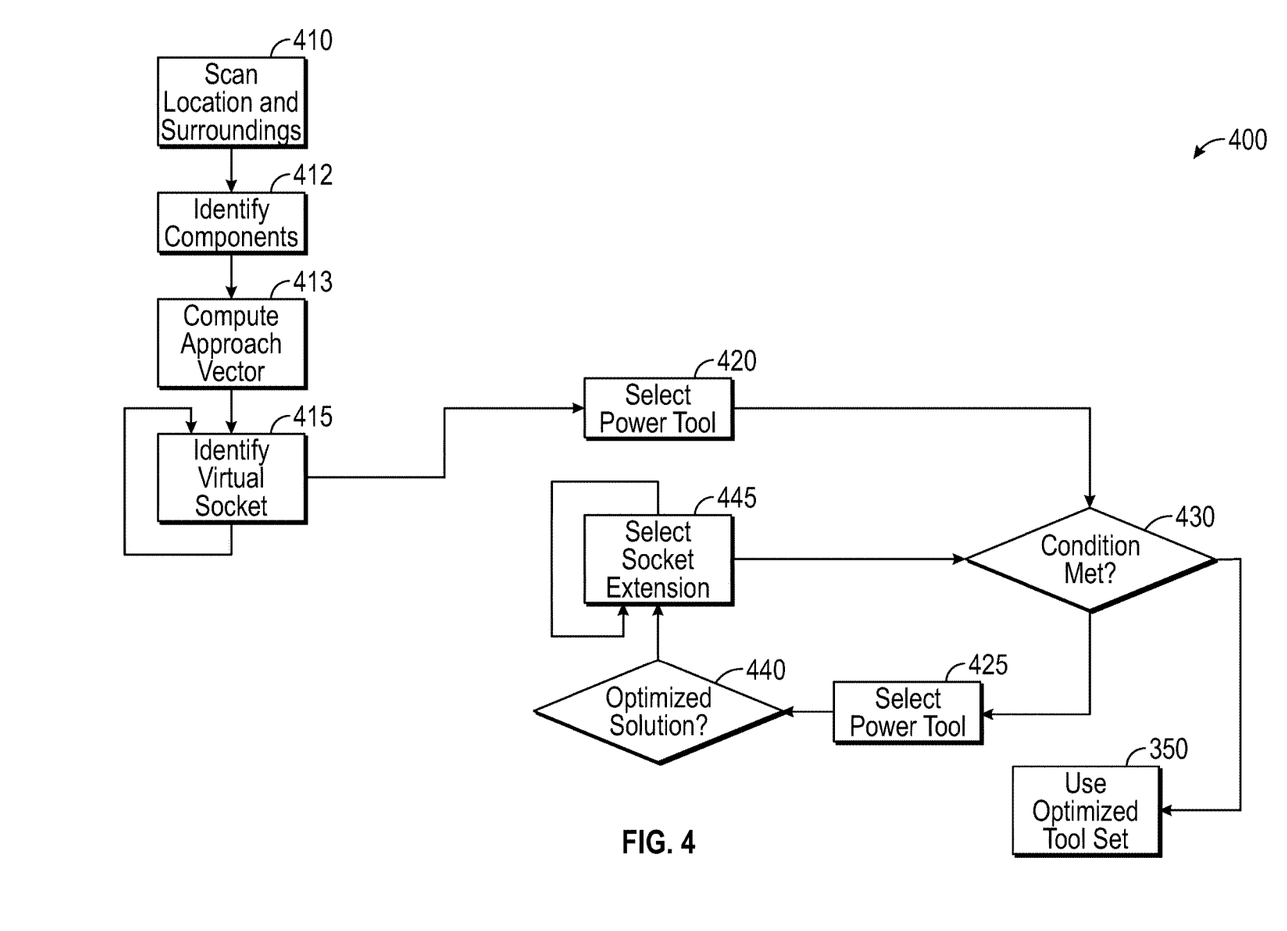
FIG. 4 is a logic flow diagram of a sensor based method for designing a composite tool to manipulate a specific known fastener with constrained access and torque specifications according to various embodiments.

FIG. 4 is a logical flow diagram of a computer driven method 400 for designing a composite tool to manipulate a specific, known fastener 210 with constrained access 205 and with specific torque specifications. At process 410, the location and surroundings of the fastener 210 are scanned in three dimensions by scanning means 190.

The length of installed fasteners is unknown information unless the fastener 210 is first removed and measured, which presents a catch-22 dilemma; or, it is visually identified and referenced from the Library of Objects 170a. However, the possibility that non-documented alternative fasteners have been used limits the reliability of research to identify the fastener 210. Sonic, magnetic or electromagnetic (e.g., x-ray) devices are advantageous scanning means 190 to determine the unknown length of an installed fastener and the type and size of the fastener's driving end.

At process 412, components 215 that are located adjacent to, or in the immediate vicinity of a fastener 210 of interest are identified and their dimensions are retrieved form the Products Specifications Library 170c and loaded into the processor 110 or memory device 180. At process 413, the processor 110 computes a most likely "approach vector" that allows the most direct access to the fastener. If a desired sector for the approach vector is unspecified, process 412 starts at a random position and then is incrementally moved in a circle until the clearance conditions are met. If an approach vector is specified by a sector (wedge shaped area) it starts at the center of the vector along a line that bisects this vector and incrementally alternates on both sides of this bisector and checks to see if that position clears the surrounding parts.

Alternatively or cumulatively, components 215 that are located adjacent to, or in the immediate vicinity of a fastener of interest are identified and their dimensions are retrieved form the Products Specifications Library 170c and loaded into the processor 110 or memory device 180.

At process 415, a virtual socket 240 is identified that properly fits the driving portion of the selected fastener 210 (e.g., nut, bold or screw) from the scanned measurements of the fastener 210 stored in the Library of Objects 170a by the processor 110. The virtual socket 240 selected may be a random socket that is known to fit the driving portion of the fastener 210 or may be a socket of a certain type based on an algorithm that sorts the Library of Objects 170a. For the sake of simplicity of explanation, the initial socket selected will be assumed to be the "standard" length socket that properly fits the driving portion of the fastener 210. Once selected, the virtual socket 240 is virtually positioned on the driving end of the fastener(s) 210 where an application 111 (See, FIG. 1) executing on processor 110 determines if there is a "hard interference." In alternative embodiments, actual sockets 240 matching the virtual socket selected may be tested by hand or by a robot device to verify a clearance or lack thereof.

When a hard interference exists, then the method 400 cycles through the virtual sockets 240 of different lengths that are known to fit the driving end of the fastener 210 to determine if the hard interference clears. If the hard interference cannot be cleared the method indicates (i.e., flags) the particular fastener 240 and proceeds to repeat the process 415 for any of the other fasteners 240 of interest. If the hard interference clears, the method proceeds to process 420. If not, the fastener is flagged with a hard interference.

At process 420, a power tool is selected by the processor 110. The power tool selection criteria include a pre-defined "recommended" tool as well as alternative tools that can deliver the torque specifications for the product from the Library of Rules 170b. The torque specifications comprise a range. The low end of the range depends at least in part on torque required for the proper joining of the parts concerned, the material comprising those parts. The maximum torque depends at least in part on the torsion tolerance of the material comprising the fastener so that the driving end of the fastener is not twisted off. Another power tool selection criteria includes the form factor dimensions of the tool. Further, "best practices" and "lessons learned" may also be a factor in selecting a power tool 230.

The "best practices," "lessons learned" or other information concerning the product components 215 and the power tool 230 may indicate that a particular "approach vector" be stipulated. An approach vector is a direction from which the power tool approaches the fastener 210. The approach vector may be stipulated as a range of vectors or an "allowable angle/sector" in three dimensions. If an allowable angle is stipulated, then the application 111 initially positions the power tool at an approach vector that bisects the allowable angle/sector.

The process 420 then determines if there is a hard interference or a soft interference that occurs at the approach vector. If so, the approach vector is varied incrementally within the allowable angle to arrive at an interference free approach vector, with the fastener 240 as a pivot point. In some embodiments, an interference condition and approach angle may be verified by applying the composite tool 220 to a fastener 210 by hand or a robot device may test the clearance.

At decision point 430, it is determined whether the power tool 230 and socket 240 combination existing at process 420 accesses the fastener 210 and is capable of delivering the required torque. Further, when contact is determined to exist at all possible approach angles at decision point 430, the fastener is flagged with a "red" condition the method moves to process 440. Otherwise the fastener 210 is flagged as being clear or, in the words, has a green or yellow condition. If cleared, the method moves to process 450.

If a red condition is not cleared at decision point 430, a determination is made at determination point 425 as to whether or not all of the sockets 210 in the Library of Objects 170a have been considered by the method 400. If not, the method 400 returns to process 415 where an alternative type socket 240 or alternative sized socket of the same type is selected by the processor 100 and another power tool is selected.

Alternatively, if all sockets 240 have been considered and the non-interference requirements of the socket-power tool combination have not been met at decision point 330, then the method proceeds to process 445 where the processor 110 selects a socket extension 250 for inclusion into the tool 220 in an attempt to clear any red interference conditions. In this process, the original standard socket that was determined to be interference free is chosen from the Library of Objects 170a along with a socket extension that is indicated in the Library of Objects 170a to be compatible with the socket.

If the addition of the extension to the tool 220 does not clear the red condition of the socket and power too combination, then the method proceeds to investigate all combinations of sockets 240 that have been found to be interference free and extensions 250 that are compatible with the power tool 230 until a combination of socket, extension and power tool is found that clears the red (i.e., hard interference) condition in both the pre and post-secure positions at process 430. Regardless as to whether a combination of socket and extension is found that clears the hard interference condition at both the pre and post-secure positions, when all of the combinations of sockets 240, extensions 250 and power tools 230 have been examined the method 400 proceeds to process 440. Fasteners that have hard interferences (i.e. red condition) that cannot be cleared are assigned a "standard" sized socket with the best fit extension and power tool to at least minimize contact with the surrounding product components 215.

At process 440, an optimized solution for all of the fasteners of interest is determined. For fasteners 210 that have a tool 220 solution that results in no interferences or has a soft interference (i.e., a yellow condition) with a product component 215, then the number of tool combinations (Socket, extension, power tool) is minimized. This is done by iteratively determining if the tool 220 for one of the fasteners of interest will work interference free for any of the others. If a single combination tool will not work for all fasteners, then it is determined if two combinations will work for all of the fasteners of interest. The process is continued until the minimum number of tool combinations is found that may be applied to all of the fasteners of interest and then proceeds to process 450.

The method 400 creates a matrix of solutions. Rows may be the fasteners and columns may be the solutions, or vice versa. In the solutions column the method keeps track of all the sockets/extensions/tools that did not work for each fastener until the solution was found. Then it back traces to see if solution that worked for fastener 4, for example, is not ruled out for fastener 1 and then checks to see if this will work for fastener 1. Process is repeated for other fasteners.

At process 450, the optimized tool set is used to document the pre and post secure positions for each tool for each fastener of interest as well as a workable approach vector or the workable approach angle(s). Each fastener of interest is indicated as having a red condition (hard interference-no resolution), yellow condition (soft interference-marginal access), or green (no interference).

At process 460, a report (graphical or hard copy) is compiled and presented to a user describing the designed tools 220. The report includes, but is not limited to power tool model, socket specification, extension specification and what product parts 215 are causing the interference conditions. Drawings may be also be presented to the user showing the locations of each fastener, recommended approach angles, and clearances in both the pre and post secure positions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claim and the legal equivalents thereof.

What is claimed is:

1. A computer implemented method for designing a composite tool to manipulate a specific known fastener in a product, the fastener having a constrained access and specific torque requirements, the method comprising:

electronically selecting a virtual socket with a first end and a second end that is configured to properly engage the fastener at a driving end of the fastener;
 virtually positioning the fastener in a pre-secure and a post-secure position within a virtual constrained access;
 electronically determining the existence of an interference condition at either or both of the pre-secure or post-secure position; and
 when an interference condition exists, electronically selecting another socket with a different dimension and repeating the virtually positioning of the fastener and the electronically determining the existence of an interference.

2. The computer implemented method of claim 1, further comprising determining the dimensions of the virtual constrained access.

3. The computer implemented method of claim 2, wherein the determination of the dimensions of the virtual constrained access is made from one of information retrieved from a database and from a scanning means.

4. The computer implemented method of claim 3, further comprising:

when an interference condition does not exist in regard to the virtual socket, selecting a virtual power tool to meet fastener torque specifications and that is configured to accept the virtual socket at the second end.

5. The computer implemented method of claim 4, further comprising:

determining whether at any approach vector an interference condition does not exist between the selected virtual power tool and a component of the product when the power tool is virtually connected to the virtual socket at either the pre-secure position of the post-secure position.

6. The computer implemented method of claim 5, wherein when an interference condition exists, selecting and adding a virtual socket extension between the second end of the virtual socket and the virtual power tool and determining whether at any approach angle an interference condition does not exist between any of the virtual socket, the virtual extension or the virtual power tool.

7. The computer implemented method of claim 5, wherein the scanning means comprises one or more of an optical scanner, a laser scanner, a sonic scanner, a magnetic scanner, and an electromagnetic scanner.

8. The computer implemented method of claim 4, wherein the scanning means is manipulated by a robot.

9. The computer implemented method of claim 5, wherein the determination of whether at any approach vector an interference condition does not exist is accomplished by iteratively applying an actual tool to an actual product.

10. A system for designing a composite tool to manipulate a specific known fastener in a product, the fastener having a constrained access and specific torque requirements, comprising:

a display screen;
 a database;
 a means for scanning; and
 a computing device executing at least an operating system configured to operate the display screen, the database and the means for scanning, the computing device being further configured to:
 electronically select a virtual socket with a first end and a second end that is configured to properly engage the fastener at a driving end of the fastener;

virtually position the fastener in a pre-secure and a post-secure position within a virtual constrained access;

electronically determine the existence of an interference condition at either or both of the pre-secure or post-secure position; and when an interference condition exists, electronically select another socket with a different dimension and repeat the virtually position of the fastener and electronically determine the existence of the interference.

11. The system of claim 10, further comprising determining the dimensions of the virtual constrained access.

12. The system claim 11, wherein the determination of the dimensions of the virtual constrained access is made from one of information retrieved from the database and from the scanning means.

13. The system of claim 12, further comprising:

when an interference condition does not exist in regard to the virtual socket, the computing device is configured to select a virtual power tool to meet fastener torque specifications and that is configured to accept the virtual socket at the second end.

14. The system of claim 13, further comprising:

determining whether at any approach vector an interference condition does not exist between the selected virtual power tool and a component of the product when the power tool is virtually connected to the virtual socket at either the pre-secure position of the post-secure position.

15. The system of claim 14, wherein when an interference condition exists, selecting and adding a virtual socket extension between the second end of the virtual socket and the virtual power tool and determining whether at any approach angle an interference condition does not exist between any of the virtual socket, the virtual extension or the virtual power tool.

16. The system of claim 14, wherein the scanning means comprises one or more of an optical scanner, a laser scanner, a sonic scanner, a magnetic scanner, and an electromagnetic scanner.

17. The system of claim 13, wherein the scanning means is manipulated by a robot.

18. The system 14, wherein the determination of whether at any approach vector an interference condition does not exist is accomplished by iteratively applying an actual tool to an actual product.

* * * * *